United States Patent

Bias et al.

[11] Patent Number: 5,957,374
[45] Date of Patent: Sep. 28, 1999

[54] VOLTAGE BOOSTING SYSTEM AND METHOD FOR ELECTRONIC THERMOSTAT RELAY

[75] Inventors: Larry Stephen Bias, Bartlett, Tenn.; Chung Ming Cheng, Tsuen Wan, The Hong Kong Special Administrative Region of the People's Republic of China

[73] Assignee: Hunter Fan Company, Memphis, Tenn.

[21] Appl. No.: 09/042,859

[22] Filed: Mar. 17, 1998

[51] Int. Cl.[6] .................................................. G05D 23/00
[52] U.S. Cl. ......................... 236/78 R; 62/131; 324/417; 361/170
[58] Field of Search ..................................... 236/78 R, 94, 236/78 A, 78 B; 324/415, 417, 418, 422; 361/160, 170, 187, 191; 307/132 E, 132 EA, 132 M; 62/126, 127, 129, 131; 165/11.1

[56] References Cited

U.S. PATENT DOCUMENTS

| | | | |
|---|---|---|---|
| 5,042,264 | 8/1991 | Dudley | 62/131 X |
| 5,277,244 | 1/1994 | Mehta | 165/265 |
| 5,363,667 | 11/1994 | Janke et al. | 62/131 |
| 5,579,648 | 12/1996 | Hanson et al. | 62/126 |

*Primary Examiner*—Harry B. Tanner
*Attorney, Agent, or Firm*—Garrison, Morris & Haight, PLLC

[57] ABSTRACT

A microprocessor-controlled electronic thermostat system and method that detects the status of a thermostat output relay to determine if the relay has been set to a state as requested by the microprocessor and, if not, providing a boosted or increased voltage to the output relay in an attempt to correct the relay setting. Preferably, the system determines if the output relay is correctly turned off as requested by the microprocessor, and, if it is not, a first boosted voltage value is provided to the output relay in an attempt to turn the relay off. If this fails, a second higher boosted voltage value is provided to turn the output relay off. This continues periodically until an off condition is detected.

18 Claims, 3 Drawing Sheets

VOLTAGE BOOSTING SYSTEM AND METHOD FOR ELECTRONIC THERMOSTAT RELAY

BACKGROUND

1. Field of the Invention

The invention relates to the field of electronic thermostats and more particularly to a system and method for detecting the status of a thermostat system, or output, relay to determine if the relay has been set to a requested state and, if not, providing a boosted or increased voltage to the relay in an attempt to set the relay to the correct state.

2. Description of Related Art

Electronic thermostats are well known in the art. Such thermostats include a system or output relay, typically a latching relay, that may be set to an ON or OFF status. The output relay includes output relay on/off contacts that are part of the thermostat switching circuitry that provides electrical control signals to heating and air conditioning systems to actuate the heating and air conditioning units in a building environment. That is, when the thermostat output relay is ON, signals are provided to enable the turning on of either a heating system or an air conditioning system in accordance with the user selecting the heating or cooling mode. Similarly, when the system relay is OFF, thermostat output signals are discontinued and the heating and/or cooling systems are turned off.

As is known in the art, the thermostat system output relay may be turned on or off by signals from a processing unit such as a microprocessor in accordance with user inputs and operating conditions of the environment served by the thermostat. That is, the microprocessor detects when a user has selected the turning on or off of the thermostat and initiates actuation of the thermostat output relay in accordance with the user's selection.

Systems are known to monitor the status of the thermostat output relay to determine if the relay is set at the correct state, i.e., the state as requested by the microprocessor. One such system is described in U.S. Pat. No. 5,277,244, inventor V. Mehta, assigned to the same assignee as the present invention, which recognizes that the system output relay includes contacts that may incorrectly respond to spurious signals, such as power line signals or even radio signals, to cause the relay contacts to change between its on and off states. In an effort to overcome this problem, the '244 patent provides for monitoring the status of the system or output relay and, if the status is different from, i.e., inconsistent with, the correct status as had been previously set or requested by the microprocessor, the microprocessor activates the relay to change the state of the relay consistent with the requested state.

It is a problem with the prior art system, however, that sometimes the state of the output relay is not correctly set because the voltage applied to the relay coil to set the relay is insufficient to enable activation of the relay coil. For example, if the thermostat battery voltage is too low, i.e., is at a level insufficient to be able to actuate the relay, then the state of the relay will not be changed. Thus, in using the system of the '244 patent, if the state of the output relay is incorrect resulting from a low battery condition, then the relay will not be correctly reset and the microprocessor's attempts to repeatedly provide this insufficient power to the relay coil will be unavailing to change the output relay contact state.

SUMMARY OF THE INVENTION

The present invention relates to an electronic thermostat and preferably a microprocessor-controlled thermostat that provides on/off setting signals to a thermostat system, or output, relay, monitors the status of the output relay to determine if the output relay status is consistent with the requested on/off status and, if not, boosts the voltage applied to the relay coil in an attempt to change the status of the output relay. The system includes a voltage boosting circuit, such as a boost converter circuit or a voltage step-up converter circuit, that boosts a voltage source, such as a battery voltage source. (Voltage boosting circuits are known in the art; see "The Electrical Engineering Handbook", chapter 29, p. 709, edited by R. C. Dorn, 1993.) This boosted voltage is applied across the output relay coil. The microprocessor continues to activate the output relay coil, and detect the status of the output relay, until the output relay status is consistent with the requested status. The voltage boosting circuit provides increased voltage values to the relay coil if the first boosted voltage value is insufficient. The microprocessor also shuts down, i.e., disables, thermostat operation if the status of the output relay is different from the desired or requested status and appropriate shut down or error indicia is displayed on the thermostat display. Further, the thermostat may include a separate voltage monitoring circuit that operates in accordance with the microprocessor to display if the battery voltage is lower than desired.

In a preferred embodiment of the present invention, the microprocessor will only initiate the providing of a boosted voltage value to the output relay when the output relay fails to be turned to an OFF state. That is, the microprocessor only actuates the voltage boosting circuit when the output relay fails to change its state from an ON to an OFF status. On the other hand, when the microprocessor detects that the thermostat is not turned on, after being so requested, the microprocessor merely shuts the thermostat down, and emits a suitable visual display signal, so that the operator knows the system remains off and that either the battery is too low (if a low battery visual indication is provided) or there is some other problem in the system. The reason why the preferred embodiment of the present invention does not provide a boosted voltage to the output relay when the output relay fails to turn on is because one may not want to turn the heating or air conditioning system on knowing that the thermostat battery is in a weakened condition or that there is some other potential problem that resulted in the output relay not initially responding to an ON set signal from the microprocessor. Notwithstanding the above preferred embodiment, the present invention is equally applicable to providing a boosted voltage to the output relay whenever the state of the output relay is inconsistent with the intended or requested state.

Thus, it is an object of the present invention to provide a thermostat system and method for automatically detecting the failure to shut off (or turn on) heating and/or air conditioning systems in accordance with user requests and to repeatedly try to shut the systems off (or on). It is further an object of the present invention to monitor the thermostat output relay to determine if the state of the relay, particularly the OFF state of the relay, is correctly set and, if not, to increase the voltage applied to the output relay control circuit and to re-activate the output relay automatically until the output relay is set to its requested status.

These and other objects of the present invention will be apparent from a description of the preferred embodiment when read in conjunction with the accompanying drawings.

DETAILED DESCRIPTION OF PREFERRED EMBODIMENTS

Figure 1:
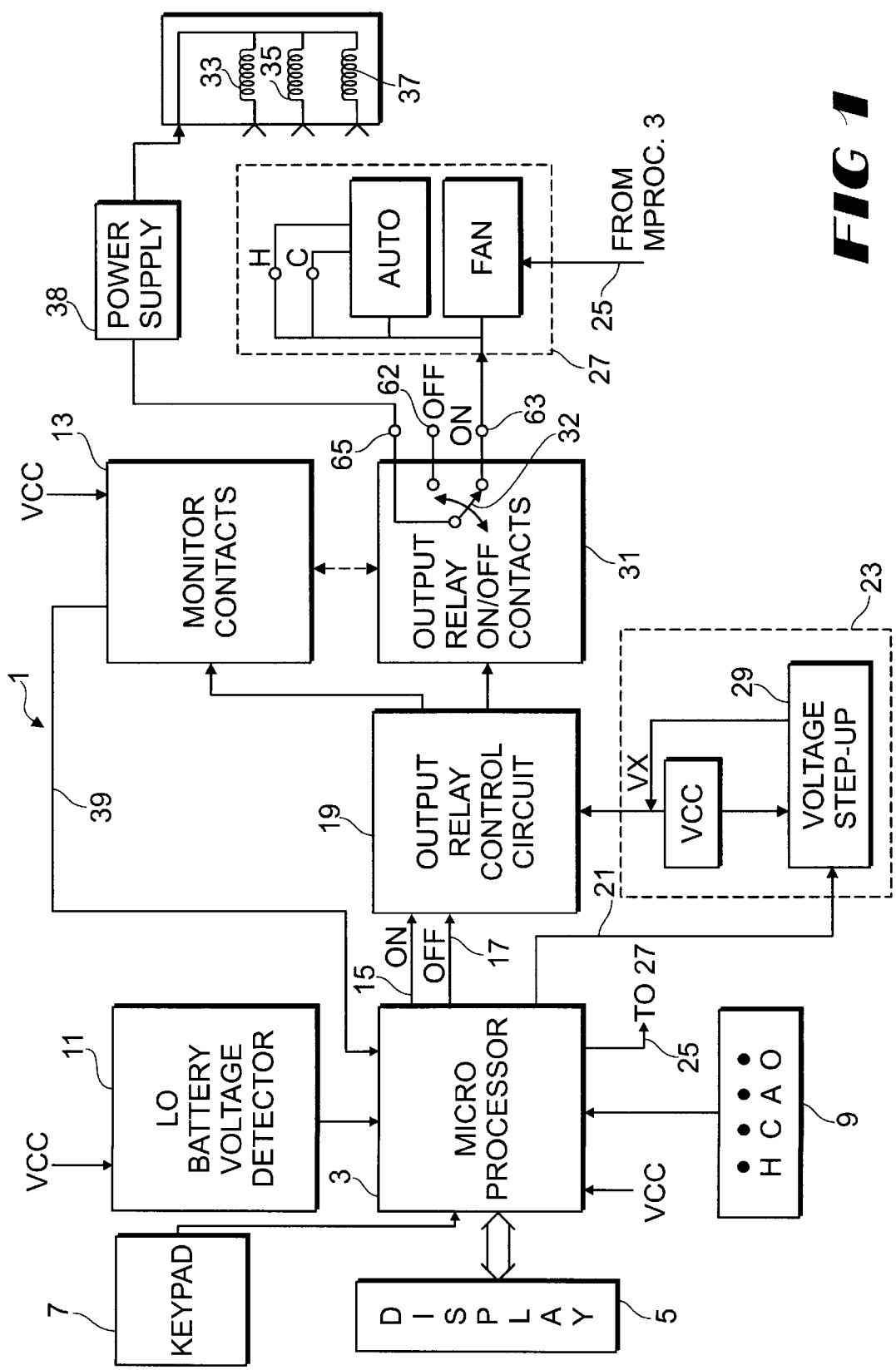
FIG. 1 is a block diagram of the structural components of the thermostat of the present invention.

The microprocessor-controlled thermostat 1 of the present invention includes a microprocessor 3 as the central processing unit (CPU) interfacing, in a well-known manner, with a display 5 for visually displaying various thermostat functions to a thermostat user, a key pad 7 which includes various input elements that may be selected by the user, an input switch 9 to place the thermostat in OFF, AUTO, HEAT or COOL modes and, a power source VCC which is typically a battery voltage source. The battery voltage typically required is nominally a 3 volt battery and may be formed by two AA batteries in series. As used herein, the term "battery voltage" could also mean any DC voltage source, such as a transformer output, that provides electrical power to the thermostat microprocessor and to the other thermostat components. The microprocessor 3 is also connected with a low battery voltage detector circuit 11 which includes circuitry, such as voltage divider circuitry, that enables the microprocessor 3 to read the battery voltage value. The microprocessor, if it detects and determines a first level low battery voltage, will so indicate by flashing suitable visual indicia on the display, such as "BATT". If the battery voltage is reduced to a second level low battery voltage, the thermostat can shut off the thermostat operation entirely, i.e., entirely disable the thermostat from further operation. Only the thermostat clock, the battery voltage detector 11 and the output relay voltage boosting system described herein will remain operable when the thermostat is in such a shut off or shut down mode. A first level low battery condition may be indicated when the battery output voltage falls below a first predetermined value that is still sufficient to operate the microprocessor 3, but may result in output relay failure, as will be described. A second level low battery condition, lower than the first level, is such that neither microprocessor operation nor output relay operation is assured.

The microprocessor 3 includes an input connected to output relay monitor contacts 13, as will be described below, and has several outputs only certain of which will be described. For example, the microprocessor 3 has latching or output relay ON/OFF outputs 15, 17 to set the output relay to an ON state or an OFF state in a manner to be described. (The system or output relay is a latching relay having an ON relay coil 41 and an OFF relay coil 43 to switch contacts 13, 31 between on and off states, as will be described.) When the microprocessor reads the selector switch 9 and determines that the user has selected a heat (H), cool (C) or auto (A) mode, which requires the turning on of the output relay in accordance with temperature values set by the user and the actual temperature values in the controlled environment, the microprocessor 3 provides an on relay set signal over line 15 to the output or latching relay control circuit 19. If the microprocessor detects and determines the selector 9 is set off (0), the microprocessor provides an off relay set signal over line 17 to the output relay control circuit 19, as will be described.

The microprocessor 3 also provides a voltage control, or voltage enable set, signal over line 21 to a voltage boosting or set-up circuit 29 which is part of an electrical power supply or voltage supply circuit 23. This voltage control signal is from a microprocessor high frequency output terminal such as a buzzer output terminal. In the present embodiment, an OKI four bit processor identified as MSM64164C is utilized and this processor includes a buzzer output that is at a relatively high frequency, specifically 5.461 kHz. The particular frequency value is not critical and other microprocessors may utilize different output frequency values. It is only necessary that this voltage control signal over line 21, provided to the voltage boosting circuit 29, is at a frequency sufficient to enable the charging of an inductor as part of a voltage boosting or step-up circuit, in a manner to be described.

The microprocessor 3 also includes various outputs, schematically indicated to be placed over line 25, which provides fan and system selecting signals to a switching circuit 27 that sets the switching circuit to heat (H) or cool (C), as is known in the art. An automatic changeover mode (AUTO) that automatically changes between heating and cooling may also be included. The microprocessor may also provide fan select signals (FAN) to the switching circuit 27 as is known in the art to turn the fan on.

Figure 2:
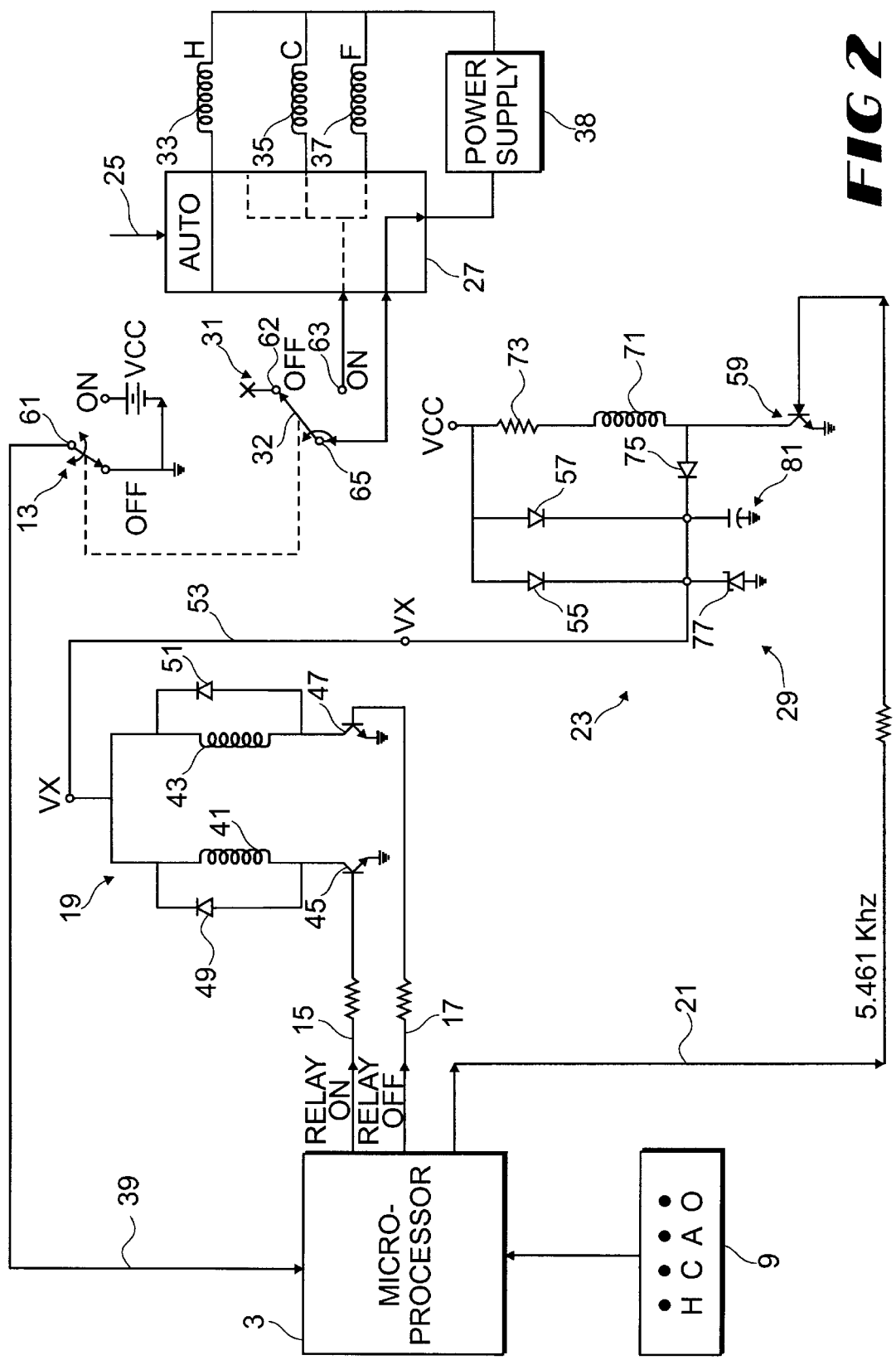
FIG. 2 is a more detailed drawing of the circuitry of the present invention.

The thermostat 3 includes an output relay (relay coils 41, 43; relay output contacts 13, 31) which is typically a latching relay that, in response to an ON or an OFF relay set signal from the microprocessor 3 over lines 15, 17 enables a voltage to be placed across one of two relay coils 41, 43 within the output relay control circuit 19, as will be described. The voltage applied to the respective ON or OFF relay coils is from a voltage supply circuit 23 and is defined as voltage value VX, as depicted in FIGS. 1 and 2, which is substantially equal to the battery voltage VCC, as will be described, or to boosted voltage values from a voltage step-up circuit 29 in accordance with microprocessor commands over line 21. The output relay includes latching relay on/off contacts 31 which, in the ON position, as shown in FIG. 1, enable actuation of the heating or cooling systems in accordance with the signals over line 25 from the microprocessor 3, as is well known in the art. The thermostat 1 provides heating and cooling actuating signals to the heating and air conditioning system in a manner also well known in the art. For example, heating, cooling, and fan actuating signals are coupled to relay windings 33, 35, 37 of heating, air conditioning, and fan systems, in a manner well-known in the art. The latching or output relay also includes another set of contacts, the monitor contacts 13, which are ganged to the latching relay on/off contacts. The monitor contact status is provided as an input over line 39 to the microprocessor 3 so the microprocessor can determine the status of the output relay, i.e., whether the output relay is ON or OFF.

With reference to FIG. 2, the output relay control circuit 19 includes two separate latching relay coils, an ON coil 41 and an OFF coil 43, each of which are connected in series to respective electronic switches such as transistor switches 45, 47. Diodes 49, 41 are connected across each of the relay coils. The relay coils receive a voltage VX over line 53 from the power supply, i.e. the voltage supply circuit 23.

Under normal conditions, when the microprocessor 3 determines that the relay position needs to be set at a particular state or needs to change state, it turns on transistor 45 to complete the circuit across the coil 41 (to set the output relay ON) or it turns on transistor 47 to complete the circuit across the coil 43 (to turn the relay OFF). This microprocessor signal over lines 15, 17 lasts for only a brief time sufficient to change the state of the output relay, such as about 8–12 ms depending upon the relay specifications, and allows current to flow from the VX terminal 53 through one of the selected latching relay coils 41, 43 and across the particular one of the closed switches 45, 47.

The voltage VX is at a value set by the voltage supply circuit 23. Under normal conditions, the VX voltage value is substantially equal to the battery voltage VCC value as shown in FIG. 2. Two (or more) germanium-type diodes 55 and 57 are used to minimize the voltage differential between VCC and VX and thus the VX voltage is generally at most only about 0.1 volts lower than the nominal 3.0 volt VCC under normal conditions. Normal conditions are defined to exist when no voltage control signal, or voltage enable set signal, is provided to the voltage boosting circuit 29 over line 21. That is, the status of the output relay is consistent with the requested status. Thus, under normal conditions, the electronic switch, such as a transistor 59, is in an OFF or open state. In such condition, current flows through the two diodes 55 and 57 and a capacitor 81 is charged to the same voltage as VX. By using two (or more) germanium diodes 55, 57 the capacitor 81 charges more quickly.

As previously discussed, the system output relay includes two sets of contacts 13, 31. The set 31 is used to turn a heating or air conditioning system on, in accordance with the status of switching circuitry 27 set by the microprocessor 3 via line 25. The other set of relay contacts, defined herein as monitor contacts 13, has a terminal 61 connected to an input of the microprocessor 3, and the microprocessor 3 reads the voltage at terminal 61. The contacts 13, 31 are ganged together mechanically.

Turning to the output relay contacts 31, the moveable contact 32 is moveable between an OFF terminal 62 and an ON terminal 63 as set by actuation of ON and OFF relay coils 41, 43. The OFF state terminal 62 is a dead terminal, i.e., is not connected to anything. The ON state terminal 63 is connected to switching circuitry 27 to activate heating and/or air conditioning units in accordance with selections over line 25 made by the microprocessor 3 as is well-known in the art. The common terminal 65 of the output relay contacts 31 is provided to a power supply 38 to provide power to the heating, air conditioning and fan relay coils 33, 35, 37.

The output relay monitor contact 13 is moveable between an OFF and ON state as well. In the OFF state, the terminal 61 is set to ground, i.e., the negative terminal of the battery. In the ON state, the terminal 61 is connected to the positive battery terminal and is thus at the VCC voltage level. The common terminal 61 is connected to the microprocessor 3 via line 39 and is read by the microprocessor 3 in accordance with the microprocessor software or program instructions as will be described. That is, the microprocessor 3 reads whether the monitor contact input line 39 is at 0 volts (ground) in which case the output relay contacts are OFF, or at the VCC voltage value, in which case the microprocessor determines the output relay contacts are ON. (This could be reversed, i.e., off could be at VCC and on could be 0 volts.) The VCC voltage value is nominally at a certain level, such as 3 volts, but this battery voltage value could drop over usage. The microprocessor 3 is capable of detecting lower voltage values and, indeed, the microprocessor can remain operable normally when the VCC voltage is down to 2 volts, for example.

When the microprocessor 3 determines that the voltage step-up circuitry 29 of the voltage supply circuit 23 should be activated to increase the VX voltage value from a first value approximately equal to VCC (as discussed above) to a second increased value, in a manner to be described below, the microprocessor 3 provides a high frequency signal over line 21 to the electronic switch, such as the transistor switch 59, to turn the transistor switch on and off at this high frequency. This electronic switch 59 is in series with an inductor 71 and resistor 73 and across the battery voltage value VCC. When transistor switch 59 is ON, energy from VCC is stored in the inductor 71. When transistor switch is OFF, energy flows through the diode 75 and increases the voltage potential at capacitor 81. Diode 75 blocks current from flowing from the capacitor 81 back to the junction between the inductor 71 and the transistor switch 59. The voltage across capacitor 81 is limited to a certain value as determined by the Zener diode 77. By way of example, the voltage may be limited to a maximum 5.6 volts across the capacitor 81 by the Zener diode 77. Thus, the voltage at VX is now higher than VCC, the amount higher determined by the duration of the high frequency signal from the microprocessor 3 over line 21 to the input of the transistor switch 59. As will be discussed below, the first time the switch 59 of the circuit 23 receives the high frequency voltage control or voltage enable set signal from the microprocessor 3, the signal duration is at a specific time such as 0.5 seconds which causes rapid charging and discharging of the inductor 71 for this 0.5 second time period. Subsequent actuation of the switch 59 is at a substantially longer time, such as approximately seven times the initial time, or 3.5 seconds. This subsequent voltage control signal duration should be a time period such that the maximum voltage across the capacitor 81 and Zener diode 77 can be reached. In the specific example provided, the subsequent voltage control signal duration that turns the switch 59 on and off should be sufficient to enable the maximum 5.6 volts to be reached. As will be described, the microprocessor 3 will repeat these subsequent voltage control or enable set signals to switch 59 at predetermined time intervals, such as every minute, until the system monitor relay contacts 13 are confirmed OFF.

Figure 3:
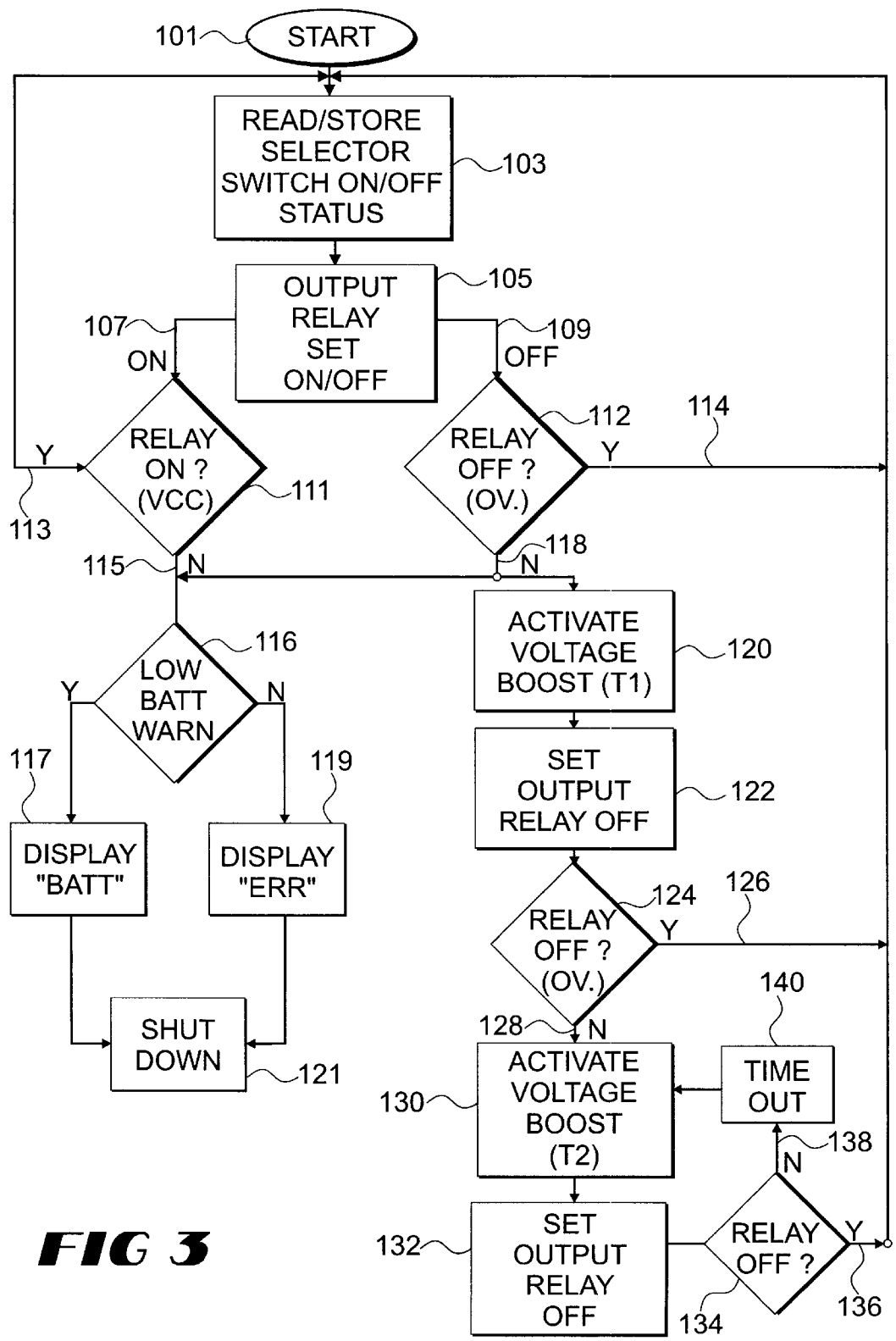
FIG. 3 is a functional flow chart of the microprocessor program.

The microprocessor 3 is programmed by the thermostat manufacturer to provide the novel operation and control as will now be described. As shown in FIG. 3, the program starts 101 when the thermostat is in operation and remains in effect at all times. That is, the microprocessor 3 continuously or at periodic time intervals reads the status of the selector switch 9, reads the output or latching relay monitor contacts 13, and provides output to the voltage boosting, or "fail safe" circuit 29 as it may be called, as appropriate. The microprocessor 3 reads the status of the selector switches 9 and stores, at a memory location, whether the output relay is to be turned ON or OFF (block 103). That is, when the selector switch 9 is at "O", an off condition as set by the user, the output relay (41, 43, 13, 31) is to be turned OFF. When the selector switch 9 is set to heating (H), cooling (C) or automatic (A) modes, the output relay is to be turned ON in accordance with the thermostat operating conditions such as the room temperature, the set temperature, etc. as is well-known in the thermostat art. That is, the output relay is turned ON and OFF in accordance with the desired temperature setting, etc. After reading and storing the desired output relay status, at block 103, the output latching relay control circuit 19 is provided with a relay ON or a relay OFF signal over one of lines 15, 17 to activate the selected output relay coil 41, 43 for a particular time period such as 8–12 ms (block 105). If the latching output relay was to be set ON, 107, the microprocessor determines if the latching relay monitor contact 13 is at the VCC value indicative of a correct ON condition (block 111). If a correct ON condition is detected, 113, this means that everything is operating correctly and the system returns. If the microprocessor 3 detects the status of the monitor relay contact is not ON, i.e., OFF or 0 volts, 115, it displays a suitable warning, 117 or 119, and shuts the thermostat down 121. Specifically, if the microprocessor 3 determines that the thermostat is at a low battery level, either a first or second level low battery value, it displays an indicia such as "BATT", 117, which flashes on the display 5 and the microprocessor 3 shuts the thermostat down as previously discussed. If no low battery condition had been detected, thus indicating that something other than a low battery condition may be preventing the relay to be operating correctly, the system displays "ERR" at 119 and shuts down, 121.

If the microprocessor 3 was to set the latching output relay OFF, 109, by providing an off relay set signal to the off relay transistor switch 47 via line 17 for a 8–12 ms time period, the microprocessor then reads the status of the relay monitoring contacts 13 to determine if an off state has been reached (block 112). That is, the microprocessor determines if a 0 volt input is at the monitoring contact terminal 61. If so (yes), 114, everything is deemed correctly set and the output relay is off. If, on the other hand, the microprocessor does not read the status of the monitor as 0 volts, but instead detects the VCC voltage value (or some lower voltage value), 118, the microprocessor 3 activates the voltage boosting or "fail safe" circuit 29 for a time period T1 by sending a high frequency signal over line 21 to the electronic switch 59 for the time period T1 (block 120). As discussed above, this time period T1 may be 0.5 seconds. During this time, the voltage boost circuit electronic switch, such as transistor switch 59 is turned on and off at the high frequency rate for this T1 time period and the inductor 71 charges and discharges to boost the VCC voltage to a voltage value VX which is a function of the time T1 that the electronic switch 59 had been receiving the high frequency signal. After the time period T1, the microprocessor then initiates another off relay set signal over line 17 to the latching relay OFF coil 43 via electronic switch 47, again for the same set time period 8–12 ms, block 122, and then checks to see if the output relay monitor contact 13 has been turned OFF (block 124). If so, the system then returns, 126. If not, 128, the microprocessor 3 again activates the voltage boost or "fail safe" circuit 23 but this time at a greater time period T2, such as a time period seven times longer than T1 (block 130). That is, if T1 is 0.5 seconds, T2 may be 3.5 seconds and the high frequency pulses over line 21 to open and close the transistor switch 59 remains for a 3.5 second period, thus assuring that the boosted voltage value VX is at a maximum value as determined by the capacitor 81 and the Zener diode 77. The time period T2 is dictated by the amount of time needed to reach the limit of Zener diode 77. The microprocessor 3 again sets the latching output relay to its OFF state (block 132) by activating the switch 47 and checks to see if the relay is OFF by reading the status of the relay monitor contacts (block 134). If "yes", 136, the system returns. If "no", 138, the microprocessor delays activating the voltage boost circuit for a predetermined time duration, at block 140, such as one minute, and then tries again. This cycle repeats itself every one minute until the latching output relay is confirmed OFF.

It should also be noted that if the output relay is not turned OFF as requested by the microprocessor, 118, the microprocessor 3 causes the display to check if a low battery warning had been detected, 116, and to indicate either a "BATT" or "ERR" condition (117, 119) as appropriate, and to shut down the thermostat, 121, as previously discussed.

The above-described embodiment utilizes a microprocessor to receive, store and send signals in accordance with arithmetic and logical operations performed by the microprocessor. However, the various functions of the microprocessor described above may be performed by electronic digital circuitry formed from integrated semiconductor circuits or discrete electrical and electronic components that are not software-driven. Such electronic digital circuitry may, for example, include logic and memory elements such as flip-flops which may store the requested state of the output relays, comparators to compare the flip-flop status with output relay contact feedback status, etc. Such electronic digital circuitry and the microprocessor are generically defined herein as a "thermostat control system".

The embodiments described above may be further modified without departing from the novel features of the present invention. For example, the status of the output relay may be monitored in other ways from that described. It may not be necessary to monitor the state of separate monitor contacts but, instead, the microprocessor may directly read the state of the output relay contacts. The monitoring of the output relay status could be in still other ways, such as by detecting the ambient temperature in the building which would enable the microprocessor to determine if the heating or cooling system had been correctly turned off. Such monitoring means may be deemed to be equivalent for purposes of the present invention.

Further, relays other than the thermostat output relay may be monitored and subjected to boosted voltage values under certain desired conditions. For example, the thermostat may have an automatic changeover relay for automatically changing between heating and cooling modes. Such a system may monitor the room temperature changes when there is to be a change from cooling to heating, for example, and if a falling, instead of an expected rising, temperature is detected, the changeover relay is assumed to be in the wrong position and boosted voltage will be applied to the changeover relay.

Still further, boosted voltage may be provided to the relay coil in ways that may differ from the specific circuitry described herein, without departing from the present invention.

Other modifications to the specific embodiments described above may be made without departing from the present invention. For example, the precise flow chart sequences may be altered to still enable the overall system operation to function as described without departing from the present invention. The present invention is limited only by the scope of the claims and equivalents thereof.

We claim:

1. A microprocessor-controlled thermostat including a microprocessor, a thermostat output relay having an ON state and an OFF state, the ON and OFF states set in accordance with on/off relay set signals from the microprocessor, an electrical power supply coupled to said output relay for providing electrical power to the output relay to enable the output relay to change between ON and OFF states in accordance with the microprocessor on/off relay set signals, said power supply providing a first voltage value and a second voltage value higher than the first voltage value in response to a voltage control signal from the microprocessor, an output relay monitor coupled with the microprocessor for indicating the ON/OFF state of the output relay, wherein if the ON/OFF state of the output relay differs from the on/off relay set signals from the microprocessor, the microprocessor issues a voltage control signal to said power supply to provide the second voltage value to the output relay.

2. The thermostat of claim 1 wherein said electrical power supply includes power supply input and output terminals, a battery voltage source connected to said input terminal, said input terminal coupled to said output terminal to provide a first voltage value at said output terminal substantially equal to said battery voltage, a voltage step-up circuit coupled between said input and output terminals for providing a second voltage value at said output terminal.

3. The thermostat of claim 2 wherein said voltage step-up circuit receives the voltage control signal from said microprocessor.

4. A microprocessor-controlled thermostat system for activating and deactivating a thermostat output relay, comprising:

a relay control circuit having a relay coil energizable for setting the state of an output relay monitor contact, the relay control circuit including a first input connected to a voltage supply circuit and a second input connected to a microprocessor for receiving a microprocessor-generated relay set signal to enable energization of said relay coil;

a relay monitor contact responsive to energization of said relay coil having a first state and a second state, said relay monitor contact connected to the microprocessor;

a voltage supply circuit having a voltage supply output connected to said first input of said relay control circuit, said voltage supply output at a first voltage substantially equal to a battery voltage output value, and increasable to a second voltage that is greater than said first voltage, said voltage supply circuit responsive to a microprocessor-generated voltage control signal to increase said voltage supply output to said second voltage;

a microprocessor for storing the state at which said relay monitor contact is to be set, for providing the relay set signal to said relay control circuit in accordance with said state, for determining whether the relay monitor contact state is set at the state stored by the microprocessor, and for generating a voltage control signal to set the voltage supply output at said second voltage when said relay monitor contact state is different from the stored state.

5. The thermostat of claim 4 wherein said voltage supply circuit further comprises a voltage boosting circuit having an input for receiving the microprocessor-generated voltage control signal.

6. The thermostat of claim 5 wherein said voltage boosting circuit includes an inductor and an electronic switch connected with said battery voltage output, said electronic switch activated to open and close at a frequency set by the voltage control signal whereby the inductor stores and discharges energy, a capacitor for receiving the battery voltage output and the discharged energy from said inductor whereby the voltage across the capacitor is at said second voltage.

7. The thermostat of claim 4 wherein said microprocessor repeatedly generates said voltage control signal until the relay monitor contact state is at the stored state.

8. The thermostat of claim 4 further comprising a relay output contact responsive to energization of said relay coil, said relay output contact having an off state and an on state.

9. The thermostat of claim 8 wherein said relay monitor contact first state is an off state and said second state is an on state, said relay monitor contact and said relay output contact ganged together.

10. An electronic thermostat system responsive to user commands and environmental conditions for monitoring and setting a thermostat relay to a requested state, the system comprising, means responsive to user commands and environmental conditions for setting the thermostat relay to a requested thermostat relay state;

monitoring means for monitoring the state of a thermostat relay;

means for determining if the state of the thermostat relay is consistent with the requested state;

voltage boosting means for providing progressively increasing voltage values to the thermostat relay to change the state of the relay if the relay state is not at the requested state.

11. The system of claim 10 wherein said voltage boosting means includes a voltage boost converter that is activated for progressively increasing time durations.

12. The system of claim 10 wherein said voltage boosting means includes a battery having a battery output voltage, an inductor for storing and discharging energy, and a capacitor chargeable to a capacitor voltage value that is a function of the battery output voltage and the discharged inductor energy, said capacitor voltage value provided to the thermostat relay.

13. A thermostat system for activating and deactivating a thermostat output relay, comprising:

a relay control circuit having a relay coil energizable for setting the state of an output relay monitor contact, the relay control circuit including a first input connected to a voltage supply circuit and a second input connected to a thermostat control system for receiving a relay set signal to enable energization of said relay coil;

a relay monitor contact responsive to energization of said relay coil having a first state and a second state, said relay monitor contact connected to the thermostat control system;

a voltage supply circuit having a voltage supply output connected to said first input of said relay control circuit, said voltage supply output at a first voltage substantially equal to a battery voltage output value, and increasable to a second voltage that is greater than said first voltage, said voltage supply circuit responsive to a thermostat control system generated-voltage control signal to increase said voltage supply output to said second voltage;

a thermostat control system for storing the state at which said relay monitor contact is to be set, for providing the relay set signal to said relay control circuit in accordance with said state, for determining whether the relay monitor contact state is set at the stored state, and for generating a voltage control signal to set the voltage supply output at said second voltage when said relay monitor contact state is different from the stored state.

14. The thermostat of claim 13 wherein said thermostat control system is a microprocessor.

15. A microprocessor-controlled thermostat method for monitoring the on/off state of a thermostat output relay and for attempting to place the output relay in one of selected on/off states, the microprocessor-controlled thermostat including a thermostat display, manually-selectable input elements, an output relay including output contacts having an off state to enable turning a heating/cooling system off and an on state to enable turning a heating/cooling system on, and monitor contacts connected to said microprocessor having corresponding off and on states readable by the microprocessor, a voltage supply circuit for supplying to the output relay a first voltage corresponding substantially to a battery-source voltage and for supplying a second voltage having a voltage value greater than the first voltage value as requested by the microprocessor, wherein the microprocessor is programmed to perform the following steps:

reading the manually-selectable input elements and determining the desired state of the output relay;

sending a relay set signal to the output relay to enable actuation of the output relay to the desired state;

reading the state of the monitor contacts;

determining if the state of the monitor contacts is different from the desired state and, if so, sending a voltage enable set signal to the voltage supply circuit to supply the second voltage to the output relay, sending another relay set signal to the output relay, determining if the state of the monitor contacts is different from the desired state and, if so, continuing the steps of sending voltage enable set signals, relay set signals, and determining the state of the monitor contacts.

16. The method of claim 15 wherein the first sending of the voltage enable set signal extends over a first time duration and subsequent sendings of the voltage enable set signals are at second time durations longer than said first time duration.

17. The method of claim 15 further comprising the step of disabling further thermostat operation if the microprocessor determines that the state of the monitor contacts is different from the desired state.

18. A thermostat method for monitoring the on/off state of a thermostat output relay and for attempting to place the output relay in one of selected on/off states, the thermostat including a thermostat display, manually-selectable input elements, an output relay including output contacts having an off state to enable turning a heating/cooling system off and an on state to enable turning a heating/cooling system on, and monitor contacts having corresponding off and on states, a voltage supply circuit for supplying to the output relay a first voltage corresponding substantially to a battery-source voltage and for supplying a second voltage having a voltage value greater than the first voltage, wherein the method comprises:

monitoring the manually-selectable input elements and determining the desired state of the thermostat output relay;

sending a relay set signal to the thermostat output relay to enable actuation of the output relay to the desired state;

monitoring the state of the monitor contacts;

determining if the state of the monitor contacts is different from the desired state and, if so, sending a voltage enable set signal to the voltage supply circuit to supply the second voltage to the output relay.

* * * * *